US012754544B2

(12) United States Patent
Petit-Bois

(10) Patent No.: US 12,754,544 B2
(45) Date of Patent: Oct. 6, 2026

(54) APPLIANCE PERFORMANCE ANALYSIS AND PREDICTION BASED ON CLOSED-LOOP CONTROL OUTPUT

(71) Applicant: Haier US Appliance Solutions, Inc., Wilmington, DE (US)

(72) Inventor: Kervins Petit-Bois, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 554 days.

(21) Appl. No.: 18/326,581

(22) Filed: May 31, 2023

(65) Prior Publication Data

US 2024/0402700 A1 Dec. 5, 2024

(51) Int. Cl.
*G05B 23/02* (2006.01)
*G05B 1/03* (2006.01)

(52) U.S. Cl.
CPC ........... *G05B 23/0283* (2013.01); *G05B 1/03* (2013.01); *G05B 23/0272* (2013.01); *G05B 2219/2642* (2013.01)

(58) Field of Classification Search
CPC .. G05B 23/0283; G05B 1/03; G05B 23/0272; G05B 2219/2642; G05B 13/048; G05B 19/0423; G05B 2219/23292; G05B 2219/24075; G05B 2219/42058; G05B 2219/50185; G05B 2219/50333; G05B 23/024; G05B 1/00; G05B 21/00; F16C 2233/00; G06Q 10/20
See application file for complete search history.

(56) References Cited

U.S. PATENT DOCUMENTS

| | | | | |
|---|---|---|---|---|
| 6,834,256 | B2 | 12/2004 | House et al. | |
| 8,051,381 | B2 * | 11/2011 | Ebrom | H04L 69/26 700/83 |
| 8,306,778 | B2 * | 11/2012 | Leao | G05B 23/0243 702/179 |
| 9,109,748 | B2 * | 8/2015 | Lakomiak | G01H 1/003 |
| 10,061,286 | B2 | 8/2018 | Wojsznis et al. | |
| 10,653,289 | B2 * | 5/2020 | Ireland | A47L 15/0021 |
| 11,005,942 | B2 * | 5/2021 | Grossman, IV | G05B 19/02 |
| 11,480,952 | B2 | 10/2022 | Hande et al. | |
| 11,656,615 | B2 * | 5/2023 | Zhou | G06F 16/2228 700/300 |

(Continued)

FOREIGN PATENT DOCUMENTS

JP 7086600 B2 6/2022

*Primary Examiner* — Huy Q Phan
*Assistant Examiner* — Martin Walter Braunlich
(74) *Attorney, Agent, or Firm* — Dority & Manning, P.A.

(57) ABSTRACT

A method of operating an appliance includes performing at least one operating cycle of the appliance. The one more operating cycle include operating a mechanical component of the appliance according to a closed-loop control algorithm. The method may also include monitoring an output of the closed-loop control algorithm during the operating cycle of the appliance, such as throughout the operating cycle of the appliance. The method may further include detecting an abnormal output of the closed-loop control algorithm or determining that the output of the closed-loop control algorithm during the operating cycle of the appliance is an abnormal output.

17 Claims, 10 Drawing Sheets

(56) References Cited

U.S. PATENT DOCUMENTS

| | | | | |
|---|---|---|---|---|
| 2001/0015918 | A1* | 8/2001 | Bhatnagar | G05B 19/0423 365/200 |
| 2016/0245273 | A1* | 8/2016 | Wagner | F04B 49/007 |
| 2019/0196430 | A1* | 6/2019 | Seo | G06Q 10/0631 |
| 2022/0171379 | A1 | 6/2022 | Zhou et al. | |
| 2022/0337448 | A1* | 10/2022 | Durham | H04L 12/2827 |

* cited by examiner

APPLIANCE PERFORMANCE ANALYSIS AND PREDICTION BASED ON CLOSED-LOOP CONTROL OUTPUT

FIELD OF THE INVENTION

The present subject matter relates generally to household appliances, including household appliances configured for performing operating cycles in which at least one mechanical component of the household appliance is operated according to a closed-loop control algorithm, and methods of analyzing the performance of such household appliances or predicting performance of such household appliances based on the output of the closed-loop control algorithm.

BACKGROUND OF THE INVENTION

Household appliances are utilized generally for a variety of tasks by a variety of users. For example, a household may include such appliances as laundry appliances, e.g., a washer and/or dryer, kitchen appliances, e.g., a refrigerator, a microwave, and/or a coffee maker, along with room air conditioners and other various appliances. Such household appliances generally include one or more mechanical components, such as a fan, heating element, motor, and other similar mechanical components. The mechanical component is operable to produce a result or output, and the output of the mechanical component during operation may be measured. For example, some household appliances include closed-loop control algorithms wherein the measured output of the mechanical component during operation is compared to a setpoint or desired output level, and a control variable for the mechanical component is generated by or output from the closed-loop control algorithm. The operation of the mechanical component may then be adjusted according to the control variable.

However, conventional appliances do not monitor or track the closed-loop control algorithm over time, such as across multiple operating cycles of the appliance.

Accordingly, a household appliance with features for monitoring the closed-loop control algorithm, such as output thereof, such as detecting abnormal control variables, would be useful.

BRIEF DESCRIPTION OF THE INVENTION

Aspects and advantages of the invention will be set forth in part in the following description, or may be apparent from the description, or may be learned through practice of the invention.

In one example embodiment, a of operating an appliance is provided. The appliance includes a user interface, a mechanical component, a sensor positioned and configured to measure a process variable associated with the mechanical component, and a controller. The controller is in communication with the user interface, the mechanical component, and the sensor. The method includes performing a plurality of operating cycles of the appliance. Each operating cycle includes operating the mechanical component according to a closed-loop control algorithm. The method also includes monitoring an output of the closed-loop control algorithm throughout the plurality of operating cycles of the appliance. During a subsequent operating cycle after the plurality of operating cycles of the appliance, the method includes detecting an abnormal output of the closed-loop control algorithm.

In another example embodiment, a method of operating an appliance is provided. The appliance includes a user interface, a mechanical component, a sensor positioned and configured to measure a process variable associated with the mechanical component, and a controller. The controller is in communication with the user interface, the mechanical component, and the sensor. The method includes performing an operating cycles of the appliance. The operating cycle includes operating the mechanical component according to a closed-loop control algorithm. The method also includes monitoring an output of the closed-loop control algorithm during the operating cycle of the appliance. The method further includes comparing the monitored output of the closed-loop control algorithm during the operating cycle of the appliance to an output of the closed-loop control algorithm during a previous operating cycle of the appliance. The method also includes determining, based on the comparison of the monitored output of the closed-loop control algorithm during the operating cycle of the appliance to the output of the closed-loop control algorithm during the previous operating cycle of the appliance, that the monitored output of the closed-loop control algorithm during the operating cycle of the appliance is an abnormal output.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
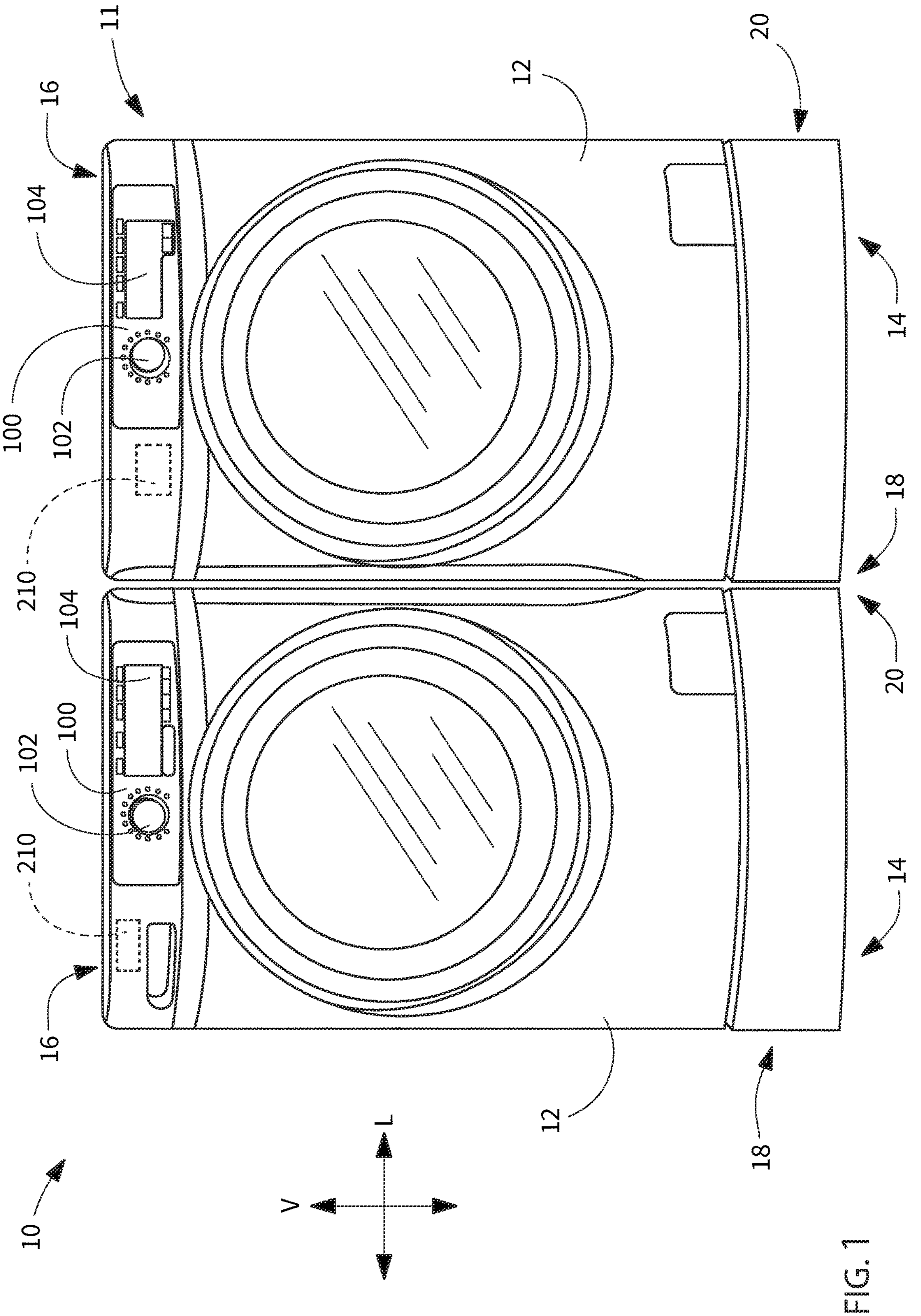
FIG. 1 provides a front view of an exemplary washing machine appliance and an exemplary dryer appliance in accordance with one or more exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counterclockwise. As used herein, numerical terms such as "first," "second," "third," "primary," "secondary," "tertiary," etc., may be used interchangeably to distinguish one component from another and are not intended to signify location or importance of the individual components.

As may be seen in FIGS. 1 through 7, in accordance with one or more embodiments of the present subject matter, a household appliance is provided. Specific examples of such household appliances are each described in turn below to illustrate various aspects and embodiments of the present disclosure. However, it should be understood that such examples are non-limiting and the household appliance of the present disclosure may include a variety of appliances with various features operable to perform household and/or domestic tasks.

Figure 2:
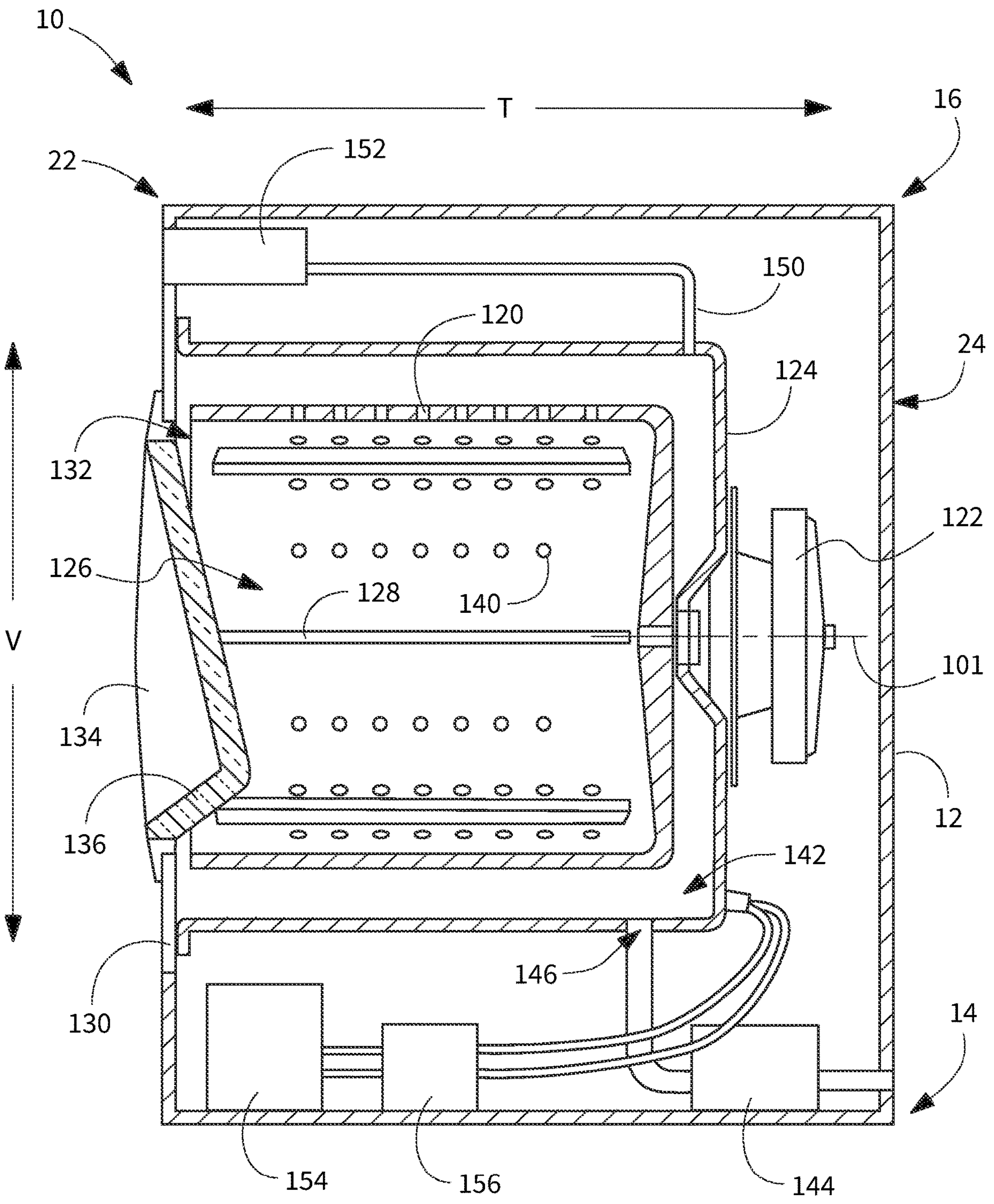
FIG. 2 provides a transverse cross-sectional view of the exemplary washing machine appliance of FIG. 1.
Figure 3:
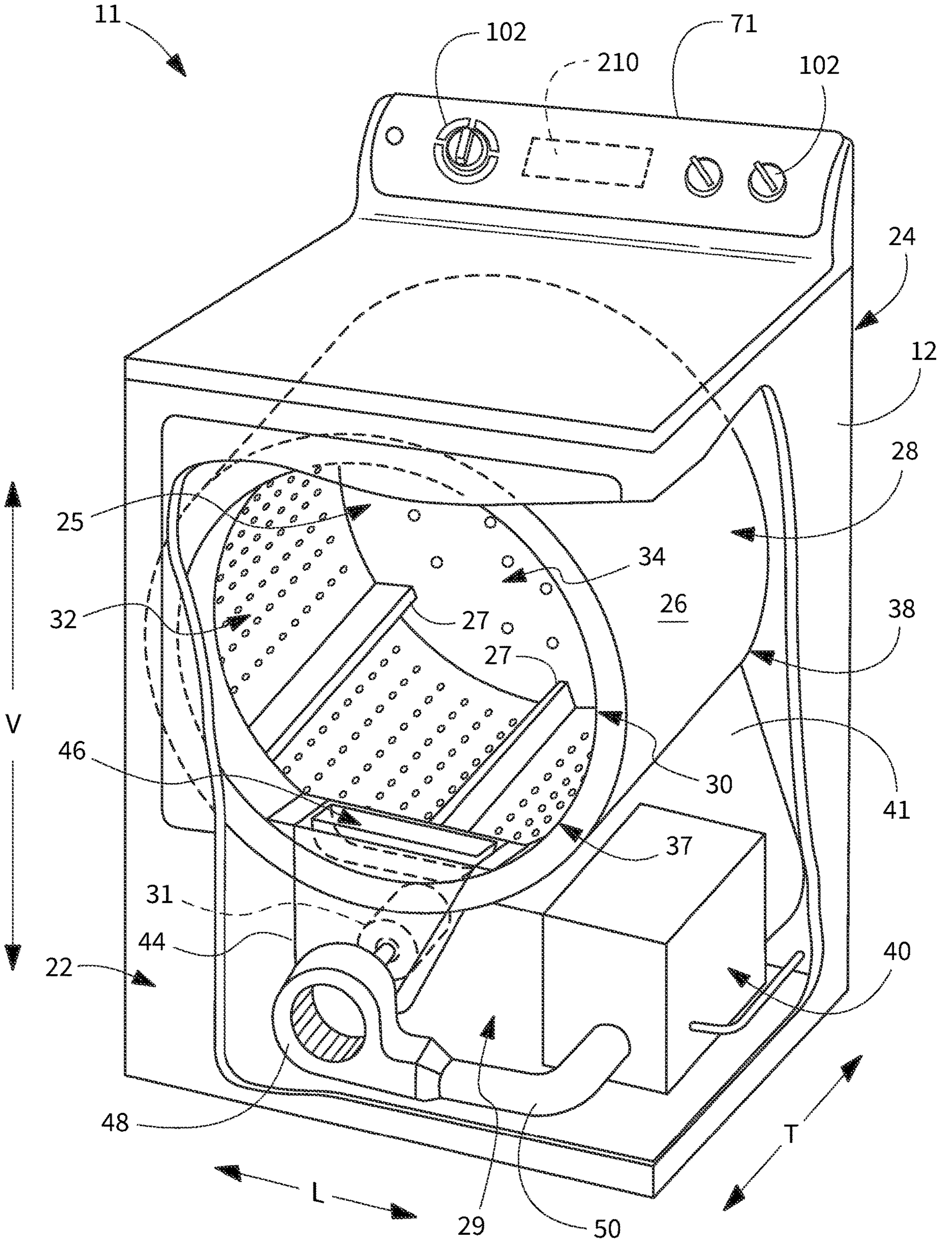
FIG. 3 provides a perspective view of the exemplary dryer appliance of FIG. 1 with portions of a cabinet of the dryer appliance removed to reveal certain components of the dryer appliance.

It should be understood that "household appliance" and/or "appliance" are used herein to describe appliances typically used or intended for common domestic tasks, such as a laundry appliance, e.g., as illustrated in FIGS. 1 through 3, or a dishwasher appliance (see, e.g., FIGS. 4 and 5), an oven appliance (see, e.g., FIGS. 6 and 7), a refrigerator, a water heater, etc., and any other household appliance which performs similar functions in addition to network communication and data processing. Thus, devices such as a personal computer, router, and other similar devices the primary functions of which are network communication and/or data processing are not considered household appliances as used herein.

As may be seen generally throughout FIGS. 1 through 7, a user interface panel 100 and a user input device 102 may be positioned on an exterior of the appliance. The user input device 102 is generally positioned proximate to the user interface panel 100, and in some embodiments, the user input device 102 may be positioned on the user interface panel 100. The user input device 102 may be used to receive a user input such as a desired setting, e.g., from which a setpoint value may be determined or derived, as described above.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be a user input device in addition to or instead of the user input device 102.

Generally, the appliance may include a controller 210 in operative communication with the user input device 102. The user interface panel 100 and the user input device 102 may be in communication with the controller 210 via, for example, one or more signal lines or shared communication busses. Input/output ("I/O") signals may be routed between controller 210 and various operational components of the appliance. Operation of the appliance can be regulated by the controller 210 that is operatively coupled to the user interface panel 100. A user interface panel 100 may for example provide selections for user manipulation of the operation of an appliance, e.g., via user input device 102 and/or display 104. In response to user manipulation of the user interface panel 100 and/or user input device 102, the controller 210 may operate various components of the appliance. Controller 210 may include a memory and one or more microprocessors, CPUs or the like, such as general or special purpose microprocessors operable to execute programming instructions or micro-control code associated with operation of the appliance. The memory may represent random access memory such as DRAM, or read only memory such as ROM or FLASH. In one embodiment, the processor executes programming instructions stored in memory. The memory may be a separate component from the processor or may be included onboard within the processor. Alternatively, a controller 210 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 210 may be programmed to operate the appliance by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions and/or instructions (e.g. performing the methods, steps, calculations and the like and storing relevant data as disclosed herein). It should be noted that controllers 210 as disclosed herein are capable of and may be operable to perform any methods and associated method steps as disclosed herein.

In some embodiments, for example, as illustrated in FIG. 1, either appliance or both appliances of a pair of laundry appliances 10 and 11 may be the household appliance. In embodiments such as illustrated in FIG. 1, the user input device 102 of each appliance 10 and 11 may be positioned on the user interface panel 100. The embodiment illustrated in FIG. 1 also includes a display 104 on the user interface panel 100 of each household appliance 10 and 11.

As generally seen throughout FIGS. 1 through 3, in at least some embodiments, each appliance 10 and 11 includes a cabinet 12 which defines a vertical direction V and a lateral direction L that are mutually perpendicular. Each cabinet 12 extends between a top side 16 and a bottom side 14 along the vertical direction V. Each cabinet 12 also extends between a left side 18 and a right side 20, e.g., along the lateral direction L.

Additional exemplary details of the laundry appliances are illustrated in FIGS. 2 and 3. For example, FIG. 2 provides a cross-sectional view of the exemplary washing machine appliance 10. As illustrated in FIG. 2, a wash tub 124 is non-rotatably mounted within cabinet 12. As may be seen in FIG. 2, the wash tub 124 defines a central axis 101. In the example embodiment illustrated by FIG. 2, the central axis 101 may be oriented generally along or parallel to the transverse direction T of the washing machine appliance 10. Accordingly, the washing machine appliance 10 may be referred to as a horizontal axis washing machine.

Referring again to FIG. 2, a wash basket 120 is rotatably mounted within the tub 124 such that the wash basket 120 is rotatable about an axis of rotation, which generally coincides with central axis 101 of the tub 124. A motor 122, e.g., such as a pancake motor, is in mechanical communication with wash basket 120 to selectively rotate wash basket 120 (e.g., during an agitation or a rinse cycle of washing machine appliance 10). Wash basket 120 defines a wash chamber 126 that is configured for receipt of articles for washing. The wash tub 124 holds wash and rinse fluids for agitation in wash basket 120 within wash tub 124. As used herein, “wash fluid” may refer to water, detergent, fabric softener, bleach, or any other suitable wash additive or combination thereof. The wash basket 120 and the tub 124 may collectively define at least a portion of a tub assembly for the washing machine appliance 10.

Wash basket 120 may define one or more agitator features that extend into wash chamber 126 to assist in agitation and cleaning of articles disposed within wash chamber 126 during operation of washing machine appliance 10. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 12 also includes a front panel 130 which defines an opening 132 that permits user access to wash basket 120 within wash tub 124. More specifically, washing machine appliance 10 includes a door 134 that is positioned in front of opening 132 and is rotatably mounted to front panel 130. Door 134 is rotatable such that door 134 permits selective access to opening 132 by rotating between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 10. Door 134 also includes a handle (not shown) that, e.g., a user may pull when opening and closing door 134. Further, although door 134 is illustrated as mounted to front panel 130, it should be appreciated that door 134 may be mounted to another side of cabinet 12 or any other suitable support according to alternative embodiments.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 10. For example, during operation of washing machine appliance 10, wash fluid may be urged by gravity from basket 120 to sump 142 through plurality of perforations 140. A pump assembly 144 is located beneath tub 124 for gravity assisted flow when draining tub 124, e.g., via a drain 146. Pump assembly 144 may be configured for recirculating wash fluid within wash tub 124.

A spout 150 is configured for directing a flow of fluid into wash tub 124. For example, spout 150 may be in fluid communication with a water supply (not shown) in order to direct fluid (e.g., clean water) into wash tub 124. Spout 150 may also be in fluid communication with the sump 142. For example, pump assembly 144 may direct wash fluid disposed in sump 142 to spout 150 in order to circulate wash fluid in wash tub 124.

As illustrated in FIG. 2, a detergent drawer 152 is slidably mounted within front panel 130. Detergent drawer 152 receives a wash additive (e.g., detergent, fabric softener, bleach, or any other suitable liquid or powder) and directs the fluid additive to wash chamber 124 during operation of washing machine appliance 10. According to the illustrated embodiment, detergent drawer 152 may also be fluidly coupled to spout 150 to facilitate the complete and accurate dispensing of wash additive.

Additionally, a bulk reservoir 154 is disposed within cabinet 12. Bulk reservoir 154 is also configured for receipt of fluid additive for use during operation of washing machine appliance 10. Bulk reservoir 154 is sized such that a volume of fluid additive sufficient for a plurality or multitude of wash cycles of washing machine appliance 10 (e.g., five, ten, twenty, fifty, or any other suitable number of wash cycles) may fill bulk reservoir 154. Thus, for example, a user can fill bulk reservoir 154 with fluid additive and operate washing machine appliance 10 for a plurality of wash cycles without refilling bulk reservoir 154 with fluid additive. A reservoir pump 156 is configured for selective delivery of the fluid additive from bulk reservoir 154 to wash tub 124.

During operation of washing machine appliance 10, laundry items are loaded into wash basket 120 through opening 132, and washing operation is initiated through operator manipulation of input selectors 102. Wash tub 124 is filled with water, detergent, and/or other fluid additives, e.g., via spout 150 and/or detergent drawer 152. One or more valves (not shown) can be controlled by washing machine appliance 10 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs

128 may again provide agitation within wash basket 120. One or more spin cycles may also be used. In particular, a spin cycle may be applied after the wash cycle and/or after the rinse cycle in order to wring wash fluid from the articles being washed. During a spin cycle, basket 120 is rotated at relatively high speeds. After articles disposed in wash basket 120 are cleaned and/or washed, the user can remove the articles from wash basket 120, e.g., by opening door 134 and reaching into wash basket 120 through opening 132.

While described in the context of a specific embodiment of horizontal axis washing machine appliance 10, using the teachings disclosed herein it will be understood that horizontal axis washing machine appliance 10 is provided by way of example only. It should be appreciated that the present subject matter is not limited to any particular style, model, or configuration of washing machine appliance. Other washing machine appliances having different configurations, different appearances, and/or different features may also be utilized with the present subject matter as well, e.g., vertical axis washing machine appliances.

FIG. 3 provides a perspective view of the dryer appliance 11 of FIG. 1, which is an example embodiment of a household appliance, with a portion of a cabinet or housing 12 of dryer appliance 11 removed in order to show certain components of dryer appliance 11. Dryer appliance 11 generally defines a vertical direction V, a lateral direction L, and a transverse direction T, each of which is mutually perpendicular, such that an orthogonal coordinate system is defined. While described in the context of a specific embodiment of dryer appliance 11, using the teachings disclosed herein, it will be understood that dryer appliance 11 is provided by way of example only. Other dryer appliances having different appearances and different features may also be utilized with the present subject matter as well.

Cabinet 12 includes a front side 22 and a rear side 24 spaced apart from each other along the transverse direction T. Within cabinet 12, an interior volume 29 is defined. A drum or container 26 is mounted for rotation about a substantially horizontal axis within the interior volume 29. Drum 26 defines a chamber 25 for receipt of articles of clothing for tumbling and/or drying. Drum 26 extends between a front portion 37 and a back portion 38. Drum 26 also includes a back or rear wall 34, e.g., at back portion 38 of drum 26. A supply duct 41 may be mounted to rear wall 34 and receives heated air that has been heated by a heating assembly or system 40.

As used herein, the terms "clothing" or "articles" includes but need not be limited to fabrics, textiles, garments, linens, papers, or other items from which the extraction of moisture is desirable. Furthermore, the term "load" or "laundry load" refers to the combination of clothing that may be washed together in a washing machine or dried together in a dryer appliance 11 (e.g., clothes dryer) and may include a mixture of different or similar articles of clothing of different or similar types and kinds of fabrics, textiles, garments and linens within a particular laundering process.

A motor 31 is provided in some embodiments to rotate drum 26 about the horizontal axis, e.g., via a pulley and a belt (not pictured). Drum 26 is generally cylindrical in shape, having an outer cylindrical wall 28 and a front flange or wall 30 that defines an opening 32 of drum 26, e.g., at front portion 37 of drum 26, for loading and unloading of articles into and out of chamber 25 of drum 26. A plurality of lifters or baffles 27 are provided within chamber 25 of drum 26 to lift articles therein and then allow such articles to tumble back to a bottom of drum 26 as drum 26 rotates. Baffles 27 may be mounted to drum 26 such that baffles 27 rotate with drum 26 during operation of dryer appliance 11.

The rear wall 34 of drum 26 may be rotatably supported within the cabinet 12 by a suitable fixed bearing. Rear wall 34 can be fixed or can be rotatable. Rear wall 34 may include, for instance, a plurality of holes that receive hot air that has been heated by heating system 40. The heating system 40 may include, e.g., a heat pump, an electric heating element, and/or a gas heating element (e.g., gas burner). Moisture laden, heated air is drawn from drum 26 by an air handler, such as blower fan 48, which generates a negative air pressure within drum 26. The moisture laden heated air passes through a duct 44 enclosing screen filter 46, which traps lint particles. As the air passes from blower fan 48, it enters a duct 50 and then is passed into heating system 40. In some embodiments, the dryer appliance 11 may be a conventional dryer appliance, e.g., the heating system 40 may be or include an electric heating element, e.g., a resistive heating element, or a gas-powered heating element, e.g., a gas burner. In other embodiments, the dryer appliance may be a condensation dryer, such as a heat pump dryer. In such embodiments, heating system 40 may be or include a heat pump including a sealed refrigerant circuit. Heated air (with a lower moisture content than was received from drum 26), exits heating system 40 and returns to drum 26 by duct 41. After the clothing articles have been dried, they are removed from the drum 26 via opening 32. A door (FIG. 1) provides for closing or accessing drum 26 through opening 32.

In some embodiments, one or more selector inputs 102, such as knobs, buttons, touchscreen interfaces, etc., may be provided or mounted on the cabinet 12 (e.g., on a backsplash 71) and are in operable communication (e.g., electrically coupled or coupled through a wireless network band) with the processing device or controller 210. Controller 210 may also be provided in operable communication with components of the dryer appliance 11 including motor 31, blower 48, or heating system 40. In turn, signals generated in controller 210 direct operation of motor 31, blower 48, or heating system 40 in response to the position of inputs 102. As used herein, "processing device" or "controller" may refer to one or more microprocessors, microcontrollers, application-specific integrated circuits (ASICS), or semiconductor devices and is not restricted necessarily to a single element. The controller 210 may be programmed to operate dryer appliance 11 by executing instructions stored in memory (e.g., non-transitory media). The controller 56 may include, or be associated with, one or more memory elements such as RAM, ROM, or electrically erasable, programmable read only memory (EEPROM). For example, the instructions may be software or any set of instructions that when executed by the processing device, cause the processing device to perform operations. It should be noted that controllers as disclosed herein are capable of and may be operable to perform any methods and associated method steps as disclosed herein. For example, in some embodiments, methods disclosed herein may be embodied in programming instructions stored in the memory and executed by the controller 210.

Figure 4:
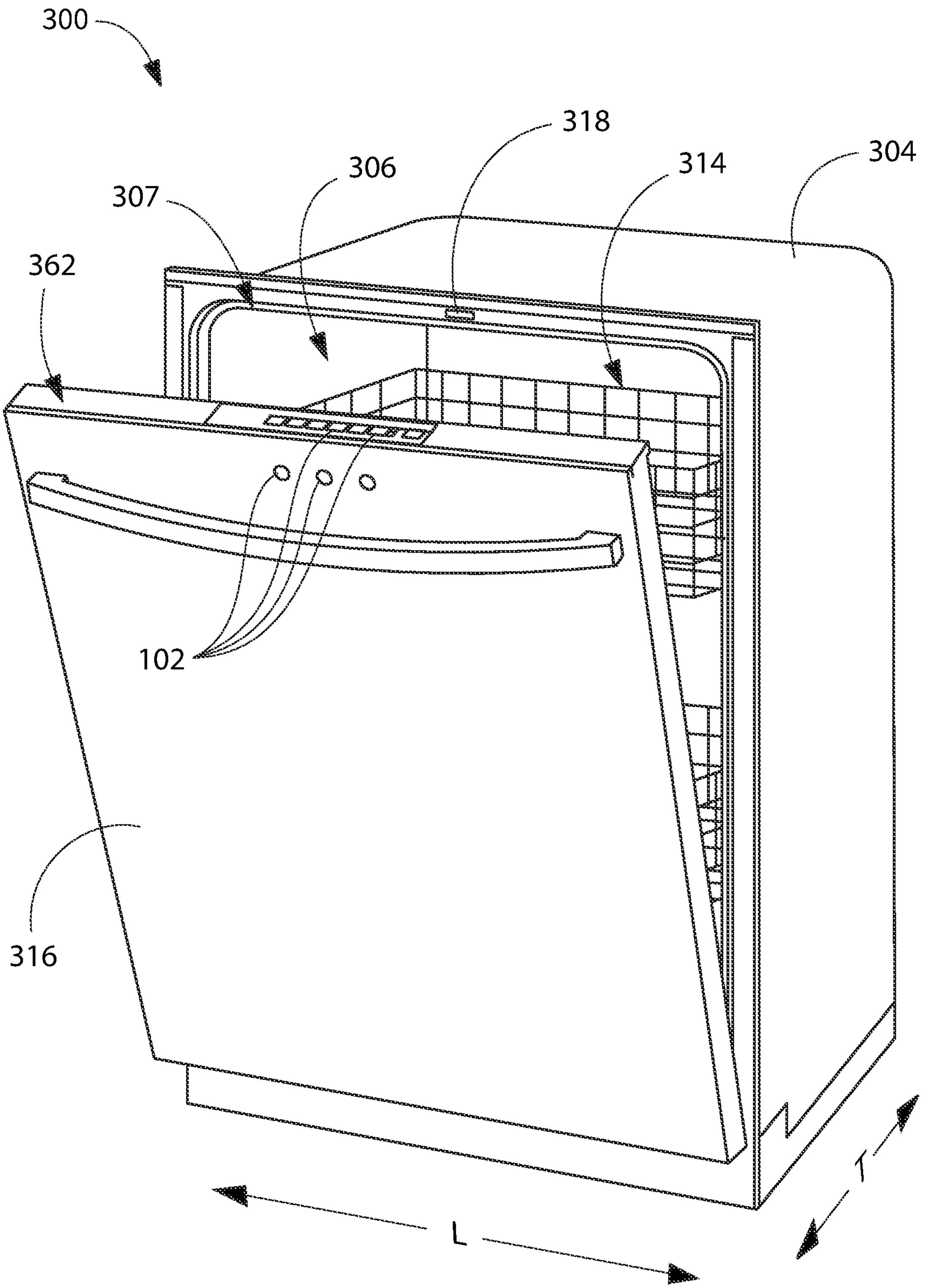
FIG. 4 provides a front view of a dishwashing appliance in accordance with additional embodiments of the present disclosure.
Figure 5:
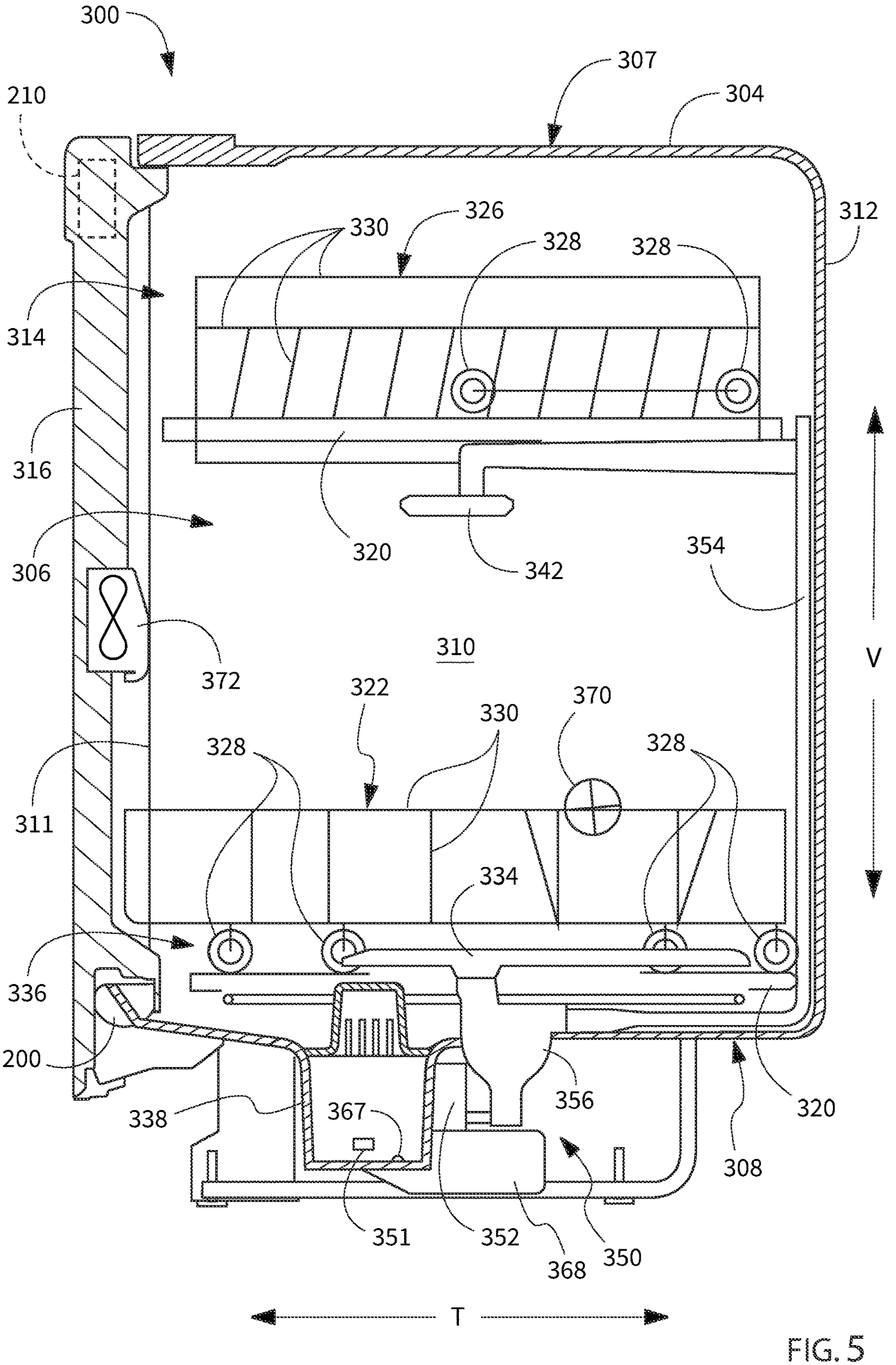
FIG. 5 provides a transverse cross-sectional view of the dishwashing appliance of FIG. 4.

Turning now to FIGS. 4 and 5, in some embodiments, the household appliance may be a dishwasher or dishwashing appliance, such as the exemplary dishwashing appliance 300, that may be configured in accordance with aspects of the present disclosure. Generally, dishwasher 300 defines a vertical direction V, a lateral direction L, and a transverse direction T. Each of the vertical direction V, lateral direction L, and transverse direction T are mutually perpendicular to one another and form an orthogonal direction system.

Dishwasher 300 includes a tub 304 that defines a wash chamber 306 therein. As shown in FIG. 5, tub 304 extends between a top 307 and a bottom 308 along the vertical direction V, between a pair of side walls 310 along the lateral direction L, and between a front side 311 and a rear side 312 along the transverse direction T.

Tub 304 includes a front opening 314 at the front side 311. In some embodiments, the dishwashing appliance 300 may also include a door 316 at the front opening 314. The door 316 may, for example, be coupled to the tub 304 by a hinge 200 at its bottom for movement between a normally closed vertical position (FIG. 5), wherein the wash chamber 306 is sealed shut for washing operation, and a horizontal open position (not shown, while a partially open position is illustrated in FIG. 4) for loading and unloading of articles from dishwasher 300. A door closure mechanism or assembly 318, e.g., a latch, may be provided to lock and unlock door 316 for accessing and sealing wash chamber 306.

In exemplary embodiments, tub side walls 310 accommodate a plurality of rack assemblies. For instance, guide rails 320 may be mounted to side walls 310 for supporting a lower rack assembly 322 and an upper rack assembly 326. In some such embodiments, upper rack assembly 326 is positioned at a top portion of wash chamber 306 above lower rack assembly 322 along the vertical direction V.

Generally, each rack assembly 322, 326 may be adapted for movement between an extended loading position (not shown) in which the rack is substantially positioned outside the wash chamber 306, and a retracted position (shown in FIG. 5) in which the rack is located inside the wash chamber 306. In some embodiments, movement is facilitated, for instance, by rollers 328 mounted onto rack assemblies 322, 326, respectively.

Although guide rails 320 and rollers 328 are illustrated herein as facilitating movement of the respective rack assemblies 322, 326, it should be appreciated that any suitable sliding mechanism or member may be used according to alternative embodiments.

In optional embodiments, some or all of the rack assemblies 322, 326 are fabricated into lattice structures including a plurality of wires or elongated members 330 (for clarity of illustration, not all elongated members making up rack assemblies 322, 326 are shown). In this regard, rack assemblies 322, 326 are generally configured for supporting articles within wash chamber 306 while allowing a flow of wash liquid to reach and impinge on those articles (e.g., during a cleaning or rinsing cycle). According to additional or alternative embodiments, a silverware basket (not shown) may be removably attached to a rack assembly (e.g., lower rack assembly 322), for placement of silverware, utensils, and the like, that are otherwise too small to be accommodated by the rack assembly.

Generally, dishwasher 300 includes one or more spray assemblies for urging a flow of fluid (e.g., wash liquid) onto the articles placed within wash chamber 306.

In exemplary embodiments, dishwasher 300 includes a lower spray arm assembly 334 disposed in a lower region 336 of wash chamber 306 and above a sump 338 so as to rotate in relatively close proximity to lower rack assembly 322. In this regard, lower spray arm assembly 334 may generally be configured for urging a flow of wash liquid up through lower rack assembly 322.

In some embodiments, an upper spray assembly 342 may be located proximate to and, e.g., below, upper rack assembly 326 along the vertical direction V. In this manner, upper spray assembly 342 may be generally configured for urging of wash liquid up through upper rack assembly 326.

The various spray assemblies and manifolds described herein may be part of a fluid distribution system or fluid circulation assembly 350 for circulating wash liquid in tub 304. In certain embodiments, fluid circulation assembly 350 includes a circulation pump 352 for circulating wash liquid in tub 304. Circulation pump 352 may be mounted to sump 338 and in fluid communication with the sump 338 through a circulation outlet 351 from the sump 338.

When assembled, circulation pump 352 may be in fluid communication with an external water supply line (not shown) and sump 338. A water inlet valve (not shown) can be positioned between the external water supply line and circulation pump 352 (e.g., to selectively allow water to flow from the external water supply line to circulation pump 352). Additionally or alternatively, water inlet valve can be positioned between the external water supply line and sump 338 (e.g., to selectively allow water to flow from the external water supply line to sump 338). During use, water inlet valve may be selectively controlled to open to allow the flow of water into dishwasher 300 and may be selectively controlled to close and thereby cease the flow of water into dishwasher 300. Further, fluid circulation assembly 350 may include one or more fluid conduits or circulation piping for directing wash fluid from circulation pump 352 to the various spray assemblies and manifolds. In exemplary embodiments, such as that shown in FIG. 5, a primary supply conduit 354 extends from circulation pump 352, along rear side 312 of tub 304 along the vertical direction V to supply wash liquid throughout wash chamber 306.

In optional embodiments, circulation pump 352 urges or pumps wash liquid to a diverter 356 (FIG. 5). In some such embodiments, diverter 356 is positioned within sump 338 of dishwashing appliance 300). Diverter 356 may include a diverter disk (not shown) disposed within a diverter chamber 358 for selectively distributing the wash liquid to the spray assemblies 334, 342, or other spray manifolds or assemblies. For instance, the diverter disk may have at least one aperture configured to align with one or more outlet ports (not shown) at the top of diverter chamber 358. In this manner, the diverter disk may be selectively rotated to provide wash liquid to the desired spray device(s).

In exemplary embodiments, diverter 356 is configured for selectively distributing the flow of wash liquid from circulation pump 352 to various fluid supply conduits-only some of which are illustrated in FIG. 5 for clarity. In certain embodiments, diverter 356 includes two or more outlet ports (not shown) for supplying wash liquid to a first conduit for rotating lower spray arm assembly 334 and a second conduit for supplying upper spray assembly 342 (e.g., supply conduit 354). Additional embodiments may also include one or more additional conduits, e.g., a third conduit for spraying an auxiliary rack such as a silverware rack, etc.

In some embodiments, a supply conduit 354 is used to supply wash liquid to one or more spray assemblies (e.g., to upper spray assembly 342). It should be appreciated, however, that according to alternative embodiments, any other suitable plumbing configuration may be used to supply wash liquid throughout the various spray manifolds and assemblies described herein. For instance, according to another exemplary embodiment, supply conduit 354 could be used to provide wash liquid to lower spray arm assembly 334 and a dedicated secondary supply conduit (not shown) could be utilized to provide wash liquid to upper spray assembly 342. Other plumbing configurations may be used for providing wash liquid to the various spray devices and manifolds at any location within dishwashing appliance 300.

Each spray assembly 334 and 342, or other spray device as may be included in dishwashing appliance 300, may include an arrangement of discharge ports or orifices for directing wash liquid received from circulation pump 352 onto dishes or other articles located in wash chamber 306. The arrangement of the discharge ports, also referred to as jets, apertures, or orifices, may provide a rotational force by virtue of wash liquid flowing through the discharge ports. Alternatively, spray assemblies 334, 342 may be motor-driven, or may operate using any other suitable drive mechanism. Spray manifolds and assemblies may also be stationary. The resultant movement of the spray assemblies 334, 342 and the spray from fixed manifolds provides coverage of dishes and other dishwasher contents with a washing spray. Other configurations of spray assemblies may be used as well. For instance, dishwasher 300 may have additional spray assemblies for cleaning silverware, for scouring casserole dishes, for spraying pots and pans, for cleaning bottles, etc.

Drainage of soiled wash liquid within sump 338 may by provided, for instance, by a drain pump 368 (e.g., during or as part of a drain cycle). In particular, wash liquid may exit sump 338 through a drain outlet 367 and may flow through a drain conduit or directly to the drain pump 368. Thus, drain pump 368 is downstream of sump 338 and facilitates drainage of the soiled wash liquid by urging or pumping the wash liquid to a drain line external to dishwasher 300.

In some embodiments, a filter assembly may be provided, e.g., in the sump 338 and/or at a top entrance into the sump 338, e.g., to filter fluid to circulation assembly 350 and/or drain pump 368. Generally, the filter assembly removes soiled particles from the liquid that flows to the sump 338 from the wash chamber 306 during operation of dishwashing appliance 300. In exemplary embodiments, the filter assembly may include both a first filter (also referred to as a "coarse filter") and a second filter (also referred to as a "fine filter").

Although a separate circulation pump 352 and drain pump 368 are described herein, it is understood that other suitable pump configurations (e.g., using only a single pump for both recirculation and draining) may be provided.

Dishwashing appliance 300 may also include ventilation features, e.g., to promote improved, e.g., more rapid, drying of articles therein after the wash and rinse cycles. For example, one or more vents 370 may be provided in the tub 304 for introducing relatively dry air from outside of the tub 304 into the wash chamber 306 and/or for removing relatively humid air from the wash chamber 306 to the outside of the tub 304. In some embodiments, a fan 372 may be provided. The fan 372 may be operable to urge air through the wash chamber 306, such as to promote air circulation and/or ventilation within and through the wash chamber. Such air movement may increase the rate of evaporation of moisture from articles in the wash chamber 306 after a wash and/or rinse cycle.

In certain embodiments, dishwasher 300 includes a controller 210 configured to regulate operation of dishwasher 300 (e.g., initiate one or more wash operations). Controller 210 may include one or more memory devices and one or more microprocessors, etc., as described above. It should be noted that controllers as disclosed herein are capable of and may be operable to perform any methods and associated method steps as disclosed herein.

Controller 210 may be positioned in a variety of locations throughout dishwasher 300. In optional embodiments, controller 210 is located within a control panel area 362 of door 316 (e.g., as shown in FIG. 4). Input/output ("I/O") signals may be routed between the control system and various operational components of dishwasher 300 along wiring harnesses that may be routed through the bottom of door 316. Typically, the controller 210 includes or is operatively coupled to a user interface panel/controls 102 through which a user may select various operational features and modes and monitor progress of dishwasher 300. In some embodiments, the user interface includes a general purpose I/O ("GPIO") device or functional block. In additional or alternative embodiments, user interface includes input components, such as one or more of a variety of electrical, mechanical or electro-mechanical input devices including rotary dials, push buttons, and touch pads. In further additional or alternative embodiments, the user interface may include a display component, such as a digital or analog display device designed to provide operational feedback to a user. When assembled, the user interface may be in operative communication with the controller 210 via one or more signal lines or shared communication busses.

It should be appreciated that the invention is not limited to any particular style, model, or configuration of dishwasher 300. The exemplary embodiments depicted in FIGS. 4 and 5 are for illustrative purposes only. For instance, different locations may be provided for user input devices 102, different configurations may be provided for rack assemblies 322, 326, different spray assemblies 334, 342 and spray manifold configurations may be used, different sensors may be used, and other differences may be applied while remaining within the scope of the present disclosure.

Figure 6:
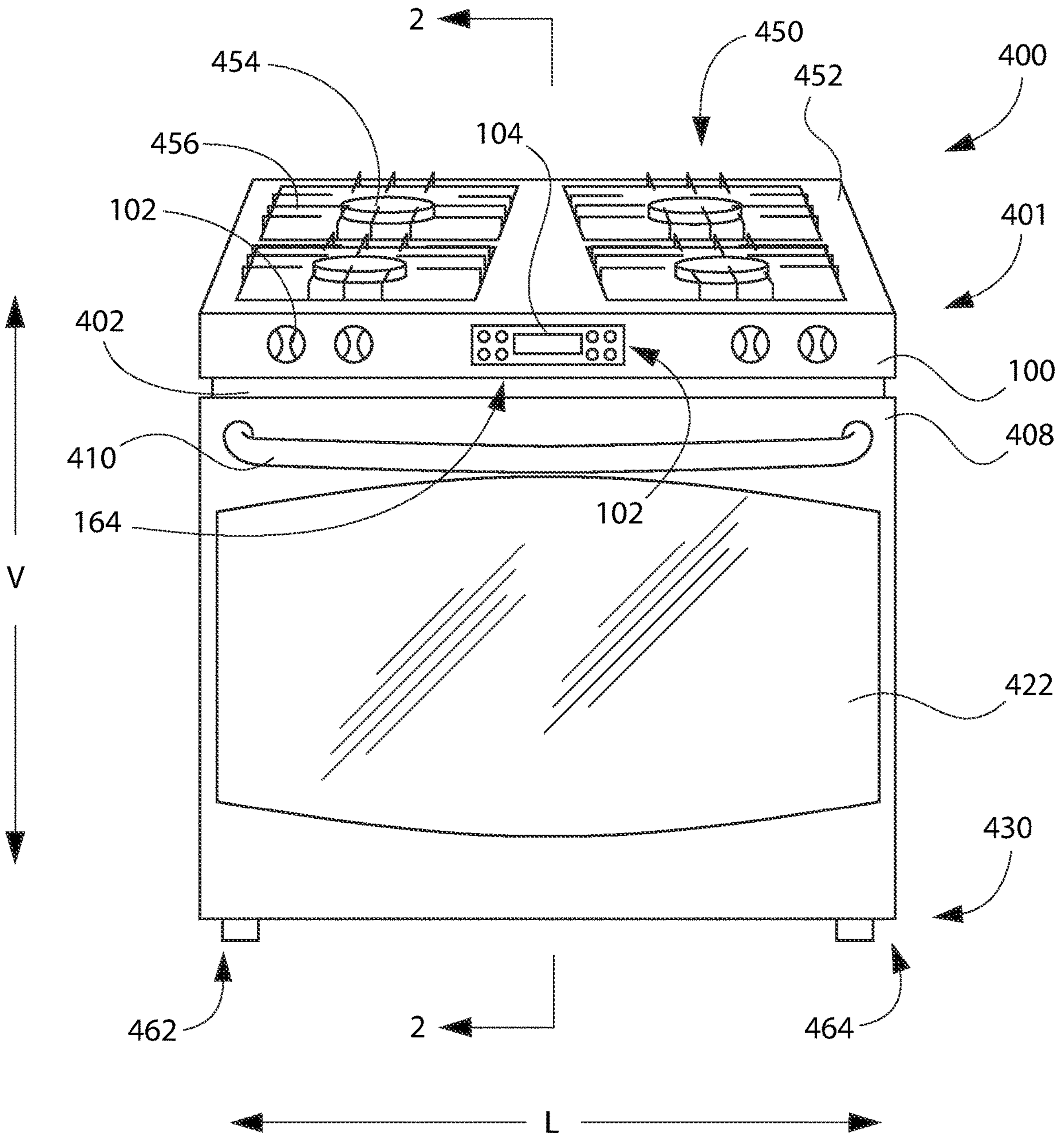
FIG. 6 provides a perspective view of an oven appliance according to one or more exemplary embodiments of the present subject matter.
Figure 7:
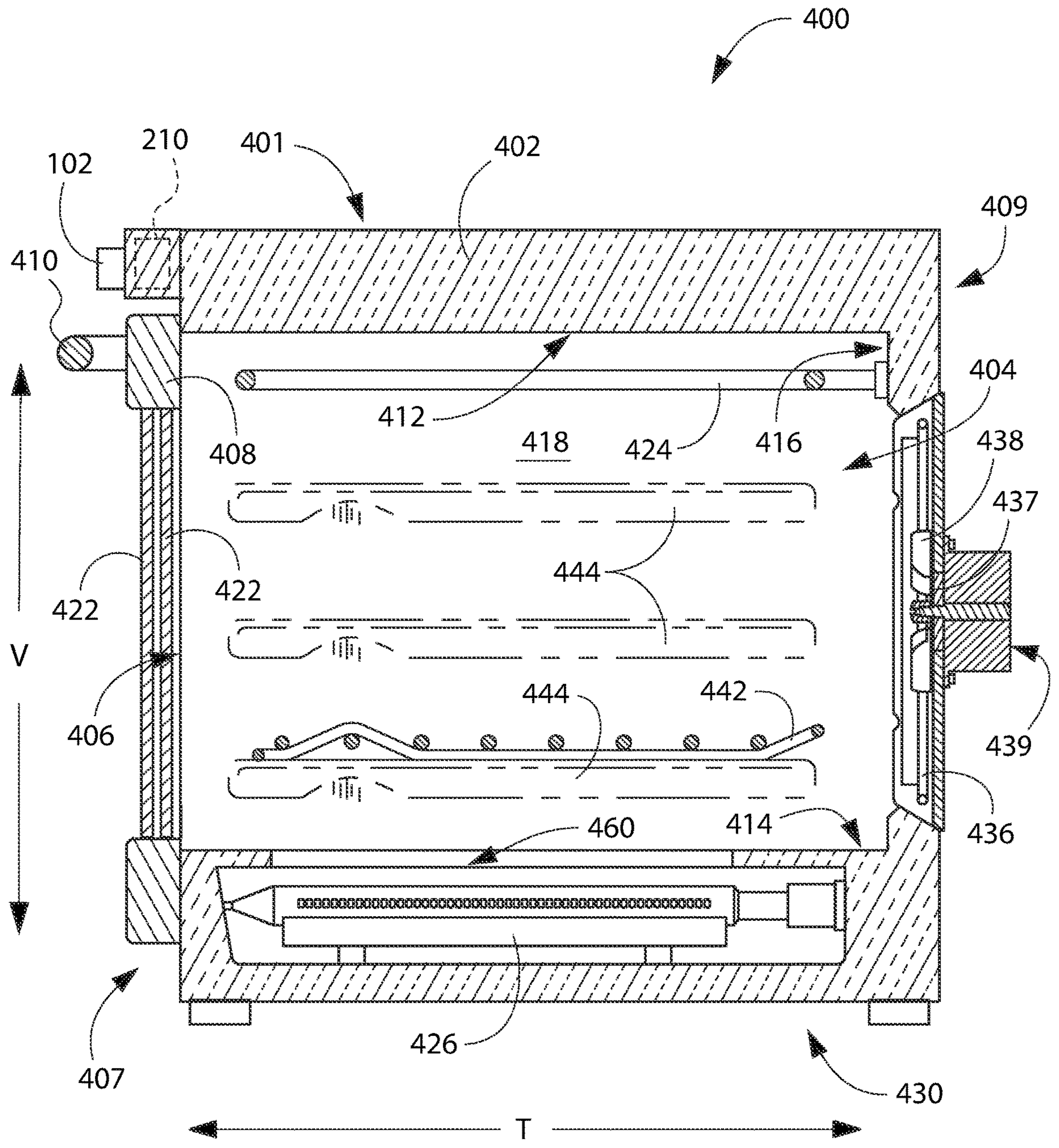
FIG. 7 provides a transverse cross-sectional view of the oven appliance of FIG. 6 taken along line 2-2 of FIG. 6.

FIGS. 6 and 7 illustrate another exemplary household appliance, which in this example is an oven appliance 400 according to an exemplary embodiment of the present subject matter. Oven appliance 400 includes an insulated cabinet 402 which defines a vertical direction V, a lateral direction L, and a transverse direction T. The vertical, lateral, and transverse directions V, L, and T are mutually perpendicular and form an orthogonal direction system. Cabinet 402 extends between a top portion 401 and a bottom portion 430 along the vertical direction V. Cabinet 402 extends between a left side 462 and a right side 464 along the lateral direction L and between a front portion 407 and a back portion 409 along the transverse direction T.

As shown in FIG. 6, oven appliance 400 includes a cooktop 450. Cooktop 450 is disposed on and is attached to or integral with cabinet 402. Cooktop 450 includes a top panel 452, which by way of example may be constructed of glass, ceramics, enameled steel, or combinations thereof. One or more burners 454 extend through top panel 452. A utensil (e.g., pots, pans, etc.) holding food and/or cooking liquids (e.g., oil, water, etc.) may be placed onto grates 456 disposed adjacent burners 454. Burners 454 provide thermal energy to cooking utensils placed on grates 456. Burners 454 can be any suitable type of burners, including e.g., gas, electric, electromagnetic, a combination of the foregoing, etc. It will be appreciated that the configuration of cooktop 450 is provided by way of example only and that other suitable configurations are contemplated.

Still referring to FIGS. 6 and 7, for this exemplary embodiment, oven appliance 400 includes an insulated cabinet 402 with an interior cooking chamber 404 defined by a top wall 412, a floor or bottom wall 414, a back wall 416, and a pair of opposing side walls 418. Cooking chamber 404 is configured for the receipt of one or more food items to be cooked. Oven appliance 400 includes a door 408 pivotally mounted to cabinet 402 at the opening 406 of cabinet 402 to permit selective access to cooking chamber 404 through opening 406. A handle 410 is mounted to door 408 and assists a user with opening and closing door 408. For example, a user can pull on handle 410 to open or close door 408 and access cooking chamber 404.

Oven appliance 400 can include a seal (not shown) between door 408 and cabinet 402 that assists with maintaining heat and cooking vapors within cooking chamber 404 when door 408 is closed as shown in FIGS. 6 and 7. Multiple parallel glass panes 422 provide for viewing the contents of cooking chamber 404 when door 408 is closed and assist with insulating cooking chamber 404. A baking rack 442 is positioned in cooking chamber 404 for the receipt of food items or utensils containing food items. Baking rack 442 is slidably received onto embossed ribs or sliding rails 444 such that rack 442 may be conveniently moved into and out of cooking chamber 404 when door 408 is open.

One or more heating elements may be included at the top, bottom, or both of cooking chamber 404 to provide heat to cooking chamber 404 for cooking. Such heating element(s) can be gas, electric, microwave, or a combination thereof. For example, in the embodiment shown in FIG. 7, oven appliance 400 includes a top heating element 424 which, in the illustrated example embodiment is an electric resistance heating element 424, and a bake heating element or bottom heating element 426, which, in the illustrated example embodiment is a gas burner 426, and bottom heating element 426 is positioned adjacent to and below bottom wall 414.

Also as may be seen in FIG. 7, the gas burner 426 is positioned within the cabinet 402 and outside of the chamber 404. In some embodiments, for example as illustrated in FIG. 7, the gas burner 426 may be a bake heating element or bottom heating element and may be positioned below the chamber 404 and separated from the chamber 404 by a partition, e.g., the bottom wall 414 of the chamber 404. The gas burner 426 may be in thermal communication and in fluid communication with the chamber by a flow path extending through one or more apertures or openings 460 in the bottom wall 414. In at least some embodiments, the flow path may extend from the gas burner 426, e.g., from ports thereof, through the opening(s) 460, and into the cooking chamber 404.

In the illustrated example embodiment, oven appliance 400 also has a convection heating element 436 and convection fan 438 positioned adjacent back wall 416 of cooking chamber 404. Convection fan 438 is powered by a convection fan motor 439. Further, convection fan 438 can be a variable speed fan-meaning the speed of fan 438 may be controlled or set anywhere between and including, e.g., zero and one hundred percent (0%-100%). In certain embodiments, oven appliance 400 may also include a bidirectional triode thyristor (not shown), i.e., a triode for alternating current (TRIAC), to regulate the operation of convection fan 438 such that the speed of fan 438 may be adjusted during operation of oven appliance 400. The speed of convection fan 438 can be determined by controller 210 (FIG. 7), which is similar to the controllers 210 described above. In addition, a sensor 437 such as, e.g., a rotary encoder, a Hall effect sensor, or the like, may be included at the base of fan 438, for example, between fan 438 and motor 439 as shown in the exemplary embodiment of FIG. 7, to sense the speed of fan 438. The speed of fan 438 may be measured in, e.g., revolutions per minute (RPM). In some embodiments, the convection fan 438 may be configured to rotate in two directions, e.g., a first direction of rotation and a second direction of rotation opposing the first direction of rotation. For example, in some embodiments, reversing the direction of rotation, e.g., from the first direction to the second direction or vice versa, may still direct air from the back of the cavity. As another example, in some embodiments reversing the direction results in air being directed from the top and/or sides of the cavity rather than the back of the cavity. Additionally, the convection heating features are optional and are shown and described herein solely by way of example. In other embodiments the oven appliance 400 may include different convection heating features or may not include convection heating features at all.

In various embodiments, more than one convection heater, e.g., more than one convection heating elements 436 and/or convection fans 438, may be provided. In such embodiments, the number of convection fans and convection heaters may be the same or may differ, e.g., more than one convection heating element 436 may be associated with a single convection fan 438. Similarly, more than one top heating element 424 and/or more than one bottom heating element 426 may be provided in various combinations, e.g., one top heating element 424 with two or more bottom heating elements 426, two or more bottom heating elements 426 with no top heating element 424, etc.

Oven appliance 400 includes a user interface 164 having a display 104 positioned on an interface panel 100 and having a variety of controls 102. Interface 164 allows the user to select various options for the operation of oven 400 including, e.g., various cooking and cleaning cycles. Operation of oven appliance 400 can be regulated by a controller 210 that is operatively coupled to, i.e., in communication with, user interface 164, heating elements 424, 426, and other components of oven 400 as will be further described. In some embodiments, display 104 can also be used as an input device. For instance, in such embodiments, display 104 can be a touchscreen device. In some embodiments, display 104 is the only input device on interface panel 164, e.g., the controls 102 may be omitted and the input functionality may be provided by the touchscreen display 104.

For example, in response to user manipulation of the user interface 164, the controller can operate the heating element (s). The controller can receive measurements from one or more temperature sensors (not shown) which are in or in thermal communication with the cooking chamber 404. The controller may also provide information such as a status indicator, e.g., a temperature indication, to the user with display 104.

Although shown with touch type controls 102, it should be understood that controls 102 and the configuration of oven appliance 400 shown in FIGS. 6 and 7 is provided by way of example only. More specifically, user interface 164 may include various input components, such as one or more of a variety of electrical, mechanical, or electro-mechanical input devices including rotary dials, push buttons, and touch pads. User interface 164 may include other display components, such as a digital or analog display device designed to provide operational feedback to a user. User interface 164 may be in communication with the controller via one or more signal lines or shared communication busses.

The present invention could also be used with other cooking appliances such as, e.g., a wall oven, a stand-alone oven, a cooktop, or other configurations of such cooking appliances. Numerous variations in the oven configuration are possible within the scope of the present subject matter. For example, variations in the type and/or layout of the controls 102 on the interface 164, as mentioned above, are possible. As another example, the oven appliance 400 may include multiple doors 408 instead of or in addition to the single door 408 illustrated. Such examples include a dual cavity oven, a French door oven, and others. As still another example, one or more of the illustrated heating elements may be substituted with microwave heating elements, or any other suitable heating elements. The examples described herein are provided by way of illustration only and without limitation.

According to various embodiments of the present disclosure, a household appliance may take the form of any of the examples described above, or may be any other household appliance where operating performance analysis and prediction of future performance, such as a useful life prediction, is desired. Thus, it will be understood that the present subject matter is not limited to any particular household appliance.

Figure 8:
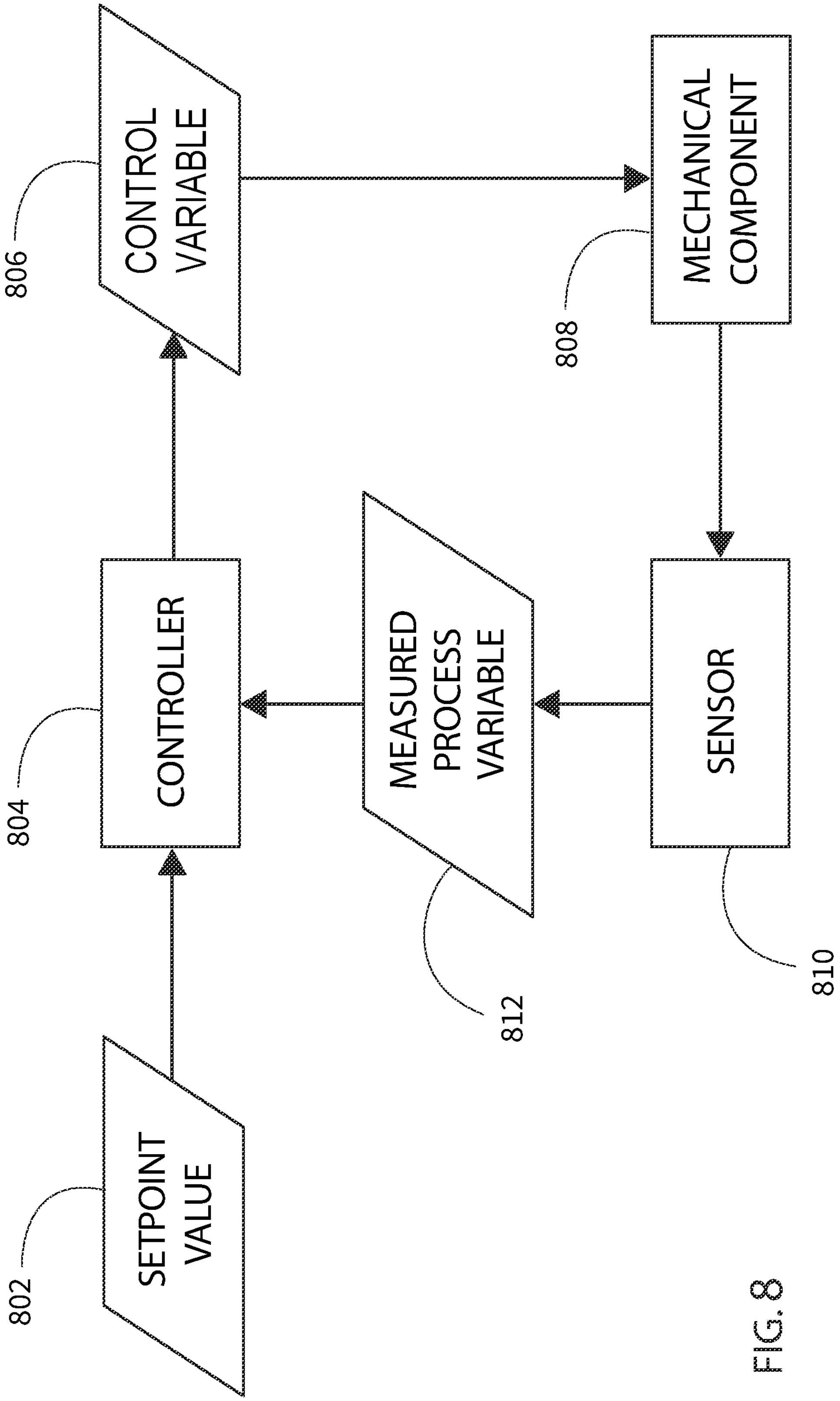
FIG. 8 provides a schematic diagram of a control system as may be used with any of the exemplary appliances of FIGS. 1-7.

A general schematic diagram of a control system as may be used with any of the exemplary appliances described above, among other possible exemplary appliances, is provided in FIG. 8. In general, a household appliance in accordance with the present disclosure includes at least one mechanical component 808. Operating or activating the mechanical component 808 may include causing at least one mechanical component 808 of the household appliance to be operated. For example, the mechanical component 808 may be a motor, a fan, a heating element or burner, a pump, or a compressor, among other possible example mechanical components of a household appliance. Also, activating the mechanical component 808 includes changing a physical status of the component, e.g., a speed, position, etc. of the component, such as accelerating the motor, fan, etc., e.g., from a zero starting speed, opening a valve, and/or other changes in the physical state of one or more mechanical components 808 of the household appliance. The mechanical component 808 is operable to produce a result or output, and the output of the mechanical component 808 during operation, e.g., during an operating cycle of the appliance, may be quantified as a process variable. For example, a fan or motor may be operable to rotate or a heating element may be operable to produce heat, e.g., the rotation of the fan or the heat produced by the heating element are exemplary outputs, and such outputs may be quantified in terms of speed, e.g., in RPM, in the case of the fan or motor, or temperature, e.g., in ° F. or ° C., in the heating element example, such that the speed of the fan or the temperature at or near the heating element are exemplary process variables related to or associated with the mechanical component, e.g., quantifying the output of the respective exemplary mechanical components. Additionally, it should be understood that operation of the mechanical component 808 produces work and alters the physical state of a matter which is worked on, such as the mechanical component 808 may heat air or solid elements proximate to the mechanical component 808, the mechanical component 808 may move or urge a fluid, such as air, water, or wash liquid, from one position or location to or towards another, among other possible examples of work performed by the mechanical component 808 during operation thereof, such as during an operating cycle of the appliance.

The household appliance may include a controller 804 (such as controller 210 described above or a portion thereof) which is in communication with various other components of the appliance. Such other components may include a user interface, such as a local user interface, e.g., a control panel on the appliance itself, and/or a remote user interface, such as the controller 804 of the household appliance may be in wireless communication with separate remote device such as a smartphone, tablet computer, personal computer, or other similar remote user interface device. The controller 804 may communicate with the user interface, wired or wirelessly, and may, for example, receive a user input such as a setpoint value 802, from the user interface. The user input may be quantitative, such as a temperature value, or qualitative, such as high or low speed, among other possible exemplary forms of user input. The setpoint value 802 may be a quantitative value and may be equal to or derived from the user input, e.g., the controller may determine the setpoint value 802 directly from the user input (e.g., when the user input is a quantitative value the setpoint may be equal to the user input) or by inference or extrapolation from the user input (e.g., when the user input is a qualitative value, such as a specific speed value in RPM when the user input is qualitative such as medium speed). The controller may, in response to the received user input and determining the setpoint value 802, output a control variable 806 for the mechanical component 808 of the household appliance, such as an electrical power level to be supplied to the mechanical component 808, a valve position for a fuel supply valve (in exemplary embodiments where the mechanical component 808 is a heating element and the heating element is a gas burner), or other similar control variables which establish an activation level or operating threshold for the mechanical component 808. Accordingly, the mechanical component 808 is activated by the controller 804, e.g., the mechanical component 808 is activated in response to and at a level determined by the control variable 806 from the controller 804.

The household appliance may further include a sensor 810, and the sensor may be in communication with the controller 804 and with the mechanical component 808. As mentioned above, the mechanical component 808 is operable to produce a result or output which may be quantified as a process variable. The sensor 810 may be in communication with the mechanical component 808, e.g., may be positioned and configured such that the sensor 810 measures the output of the mechanical component 808, e.g., the sensor may measure the process variable. The sensor 810 may then transmit the measured process variable 812 to the controller 804, e.g., a main controller of the household appliance or a dedicated closed-loop controller.

The measured process variable 812 may be compared to the setpoint value 802 to determine an error value, e.g., a difference between the setpoint value 802 and the measured process variable 812. Based on the error value, a new control variable 806 may be generated for the mechanical component 808 and the operation of the mechanical component 808 is thereby adjusted in response to the error value. The new control variable 806, e.g., which is generated or determined based on the error value, may be greater than the initial or previous control variable 806, e.g., when the measured process variable 812 is less than the setpoint value 802, or may be less than the initial or previous control variable, e.g., when the measured process variable 812 is greater than the setpoint value 802.

As may be seen in FIG. 8, the controller 804, mechanical component 808 and sensor 810 form a closed loop and thus the exemplary control system illustrated in FIG. 8 may be referred to as a closed-loop control system and/or may perform a closed-loop control algorithm. The exemplary closed-loop control system illustrated in FIG. 8 may perform any suitable closed-loop control algorithm. For example, the closed-loop control algorithm may be a Proportional-Integral (PI) control, a Proportional-Integral-Derivative (PID) control, or other similar control algorithm in which the control variable 806 may be adjusted within a constrained range or at a gradual rate. As another example, the closed-loop control algorithm may be a bang-bang control algorithm, in which the control variable 806 is adjusted more rapidly, such as the control variable 806 may be set to zero (or otherwise turn off the mechanical component 808) when the measured process variable 812 is greater than the setpoint value 802 and may return to or remain at the initial value of the control variable 806 when the measured process variable 812 is less than the setpoint value 802.

Over time, such as during the useful life of the mechanical component 808 or when maintenance may be needed, the control variable 806 output from the closed-loop control algorithm may vary. For example, over a plurality of operating cycles of the appliance, such as a plurality of operating cycles having the same or generally the same conditions, e.g., setpoint values 802 and/or error values, the control variables 806 which are generated during such operating cycles may be generally the same, such as within a range or band of values throughout each such operating cycle. However, in a subsequent operating cycle, such as a second or other later operating cycle (such as a subsequent cycle having the same or generally the same conditions as one or more prior operating cycles), one or more instances of the control variable 806 generated in the closed loop may be abnormal, such as may be outside of the expected band or may deviate from prior control variable values by more than a tolerance range. The abnormal control variable 806 may be indicative of an issue or potential issue with the mechanical component 808. Thus, for example and as will be described further below, the detection of the abnormal control variable may be used to provide a diagnostic report for the household appliance, a user notification, and/or to predict a remaining life of the household appliance, such as of the mechanical component 808 thereof.

Figure 9:
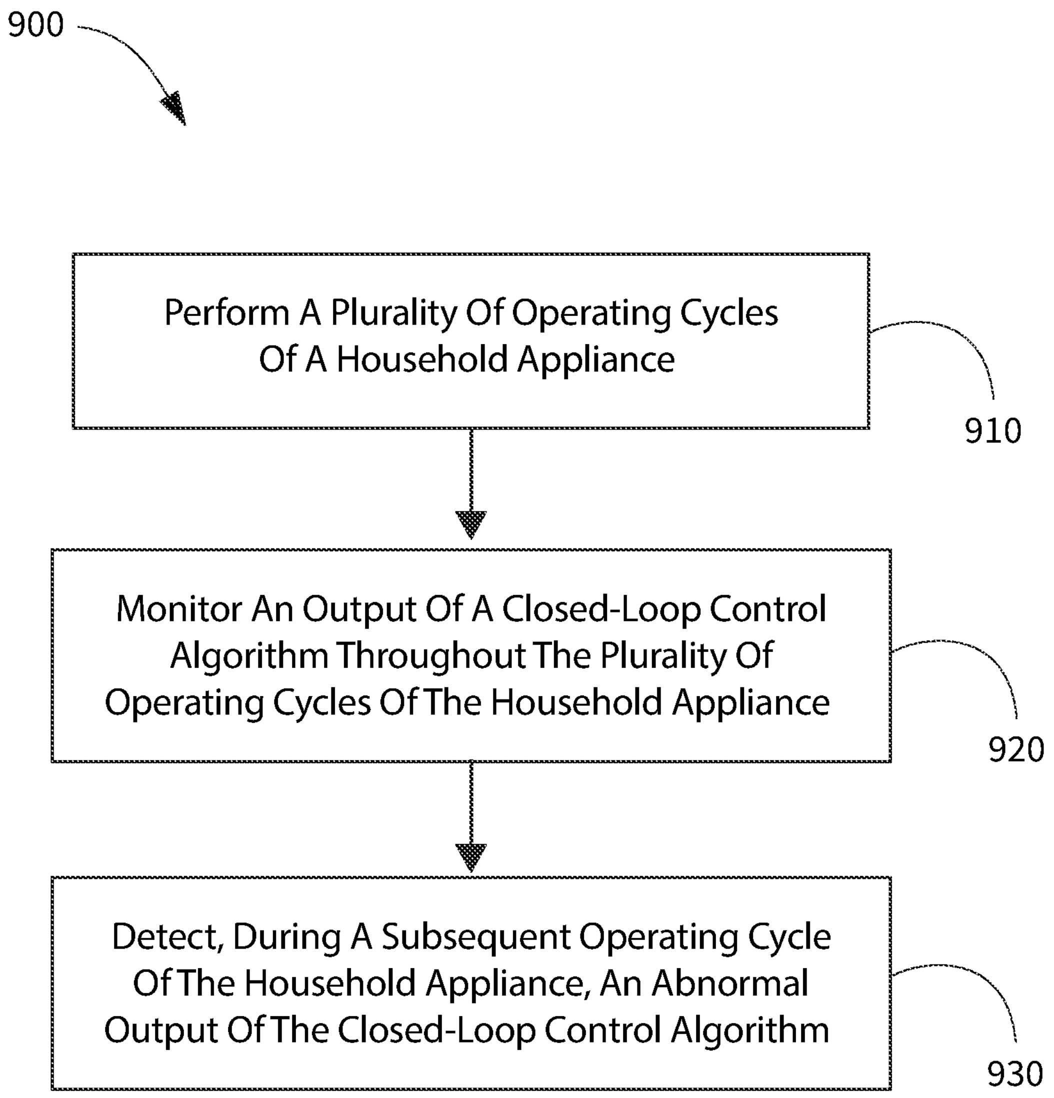
FIG. 9 provides a flow chart illustrating an exemplary method of operating an appliance according to one or more example embodiments of the present subject matter.

Referring now to FIG. 9, embodiments of the present disclosure also include methods of operating a household appliance, such as the exemplary method 900 illustrated in FIG. 9. Method 900 may be used with any suitable household appliance, such as but not limited to any of the exemplary household appliances described above. For example, the household appliance may include a user interface, a mechanical component, a sensor, and a controller, such as mechanical component 808, sensor 810, and controller 804 described above with respect to FIG. 8. The sensor may be positioned and configured to measure a process variable associated with the mechanical component, e.g., as described above with respect to FIG. 8. The controller may be in communication with the user interface, the mechanical component, and the sensor. As illustrated in FIG. 9, exemplary methods such as method 900 may include a step 910 of performing one or more operating cycles of the appliance, such as a plurality of operating cycles. Each operating cycle may include operating the mechanical component according to a closed-loop control algorithm.

The plurality of operating cycles may be similar or comparable operating cycles, e.g., may have the same or similar parameters (e.g., input) for the closed-loop control algorithm. For example, operating the mechanical component according to the closed-loop control algorithm in each operating cycle of the plurality of operating cycles may include receiving, by the controller, a setpoint value from the user interface, and the setpoint received during each operating cycle of the plurality of operating cycles may be approximately the same as the setpoint received during every other operating cycle of the plurality of operating cycles.

Method 900 may further include a step 920 of monitoring an output of the closed-loop control algorithm throughout the plurality of operating cycles of the appliance. For example, the output of the closed-loop control algorithm may be a control variable for the mechanical component.

Method 900 may also include a step 930 of detecting, during a subsequent operating cycle of the appliance, an abnormal output of the closed-loop control algorithm. For example, the plurality of operating cycles of the appliance from step 910 and the closed-loop control algorithm outputs (which may include multiple outputs for each operating cycle, e.g., where the control variable is modified based on and in response to one or more error values throughout each operating cycle) from step 920 may be used to establish a baseline or norm for the outputs, e.g., control variables, from the closed-loop control algorithm, and the subsequent operating cycle may be performed after the plurality of operating cycles, such that the abnormal output of the closed-loop algorithm may be detected during the subsequent operating cycle with reference to the baseline established from the previous plurality of operating cycles. In some embodiments, monitoring the output of the closed-loop control algorithm throughout the plurality of operating cycles of the appliance may include determining a band of typical values for the output of the closed-loop control algorithm, and the abnormal output of the closed-loop control algorithm may be outside of the band of typical values, e.g., may be detected based on being outside the band of typical values.

Figure 10:
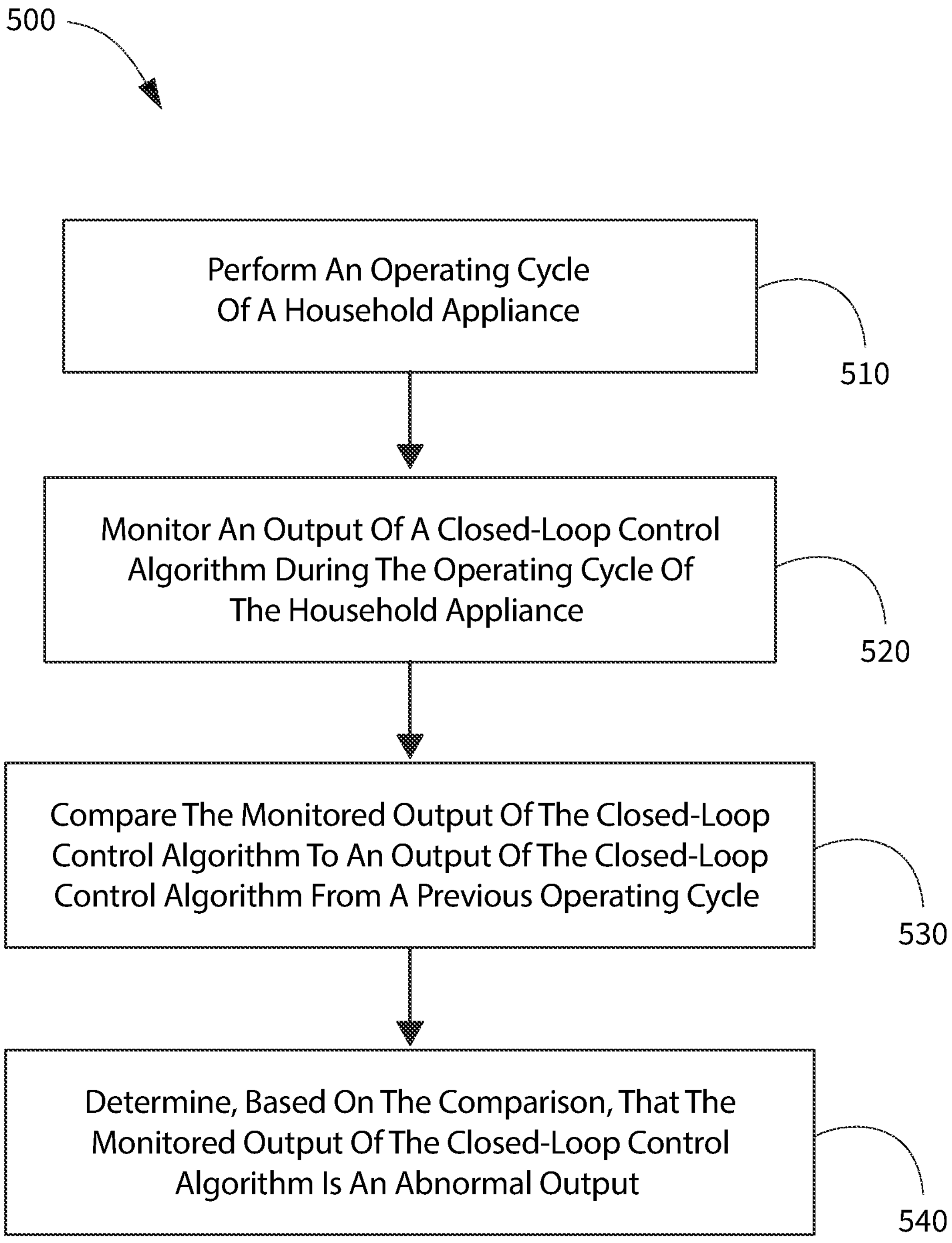
FIG. 10 provides another flow chart illustrating an exemplary method of operating an appliance according to one or more additional example embodiments of the present subject matter.

Turning to FIG. 10, another exemplary method 500 of operating a household appliance according to one or more exemplary embodiments of the present disclosure is illustrated therein. Method 500 may be used with any suitable household appliance, such as but not limited to any of the exemplary household appliances described above. For example, the household appliance may include a user interface, a mechanical component, a sensor, and a controller, such as mechanical component 808, sensor 810, and controller 804 described above with respect to FIG. 8. The sensor may be positioned and configured to measure a process variable associated with the mechanical component, e.g., as described above with respect to FIG. 8. The controller may be in communication with the user interface, the mechanical component, and the sensor. As illustrated in FIG. 10, exemplary methods such as method 500 may include a step 510 of performing an operating cycles of the appliance. The operating cycle may include operating the mechanical component according to a closed-loop control algorithm.

Still with reference to FIG. 10, method 500 may also include monitoring an output of the closed-loop control algorithm during the operating cycle of the appliance, e.g., as indicated at 520. For example, the output of the closed-loop control algorithm may be monitored during one or more portions of the operating cycle or throughout the entire operating cycle.

Method 500 may further include comparing the monitored output of the closed-loop control algorithm during the operating cycle of the appliance to an output of the closed-loop control algorithm during a previous operating cycle of the appliance, e.g., as indicated at 530 in FIG. 10. The previous operating cycle of the appliance may be a similar operating cycle. For example, operating the mechanical component according to the closed-loop control algorithm may include receiving, by the controller, a setpoint value from the user interface for an output of the mechanical component, and the setpoint value received in the operating cycle of the appliance may be the same as or within a tolerance rage of a setpoint value received in the previous operating cycle of the appliance.

As indicated at 540 in FIG. 10, method 500 may also include determining, based on the comparison of the monitored output of the closed-loop control algorithm during the operating cycle of the appliance to the output of the closed-loop control algorithm during the previous operating cycle of the appliance, that the monitored output of the closed-loop control algorithm during the operating cycle of the appliance is an abnormal output.

In some embodiments, a life of the mechanical component may be predicted based on the abnormal output of the closed-loop control algorithm. For example, predicting the life of the mechanical component based on the abnormal output of the closed-loop control algorithm may include predicting a future value of the output of the closed-loop control algorithm. The future value may be predicted based on the comparison of the monitored output of the closed-loop control algorithm during the operating cycle of the appliance to the output of the closed-loop control algorithm during the previous operating cycle of the appliance. For example, the future value may be predicted based on a trend or slope, e.g., rate of change over time, of the output of the closed-lop control algorithm. The predicted future value of the output of the closed-loop control algorithm may be compared to a critical threshold in order to predict the remaining life of the mechanical component.

Referring now generally to FIGS. 9 and 10, the methods 900 and 500 may be interrelated and/or may have one or more steps from one of the methods 900 and 500 combined with the other method 900 or 500. Thus, those of ordinary skill in the art will recognize that the various steps of the exemplary methods described herein may be combined in various ways to arrive at additional embodiments within the scope of the present disclosure.

In some exemplary methods, e.g., method 900 or method 500, the abnormal output, e.g., abnormal control variable, may be detected or determined based on, e.g., in comparison to, a trend over two or more previous operating cycles. Such trends or abnormal outputs may include an increase or decrease in the control variable needed to reach a target, e.g., setpoint value, a change in the rate of adjustment of the control variable within an operating cycle, a change in the control variable start-up profile, or a constant control variable when the control variable should be or is expected to be modified throughout the operating cycle.

Still referring to FIGS. 9 and 10, exemplary methods of the present disclosure such as one or both of methods 900 and 500 may, in some embodiments, also include predicting a future value of the output of the closed-loop control algorithm for an additional operating cycle of the appliance, e.g., a future operating cycle of the appliance. Such prediction may be based on a trend or deviation of the abnormal output from the baseline or expected value. The predicted future value of the output of the closed-loop control algorithm may be compared to a critical threshold. For example, the critical threshold may be a level at which the mechanical component is at or beyond an end of useful life of the mechanical component or is at or beyond a desired functional limit. In one example, where the mechanical component is a resistance heating element, the heating element may draw increasingly larger amounts of power to reach a setpoint temperature value as the heating element ages, until a critical amount of power input is reached, at which point the heating element may need to be repaired or replaced. A similar example may apply when the mechanical component is a fan or motor, e.g., the fan or motor may draw increasingly larger amounts of power to reach a setpoint speed (e.g., RPM) value, and when a critical amount of power input is reached, the fan or motor may need to be repaired or replaced.

In some embodiments, exemplary methods according to the present disclosure may also include providing a user notification, e.g., on a display such as display 104 or on a remote device such as a smartphone, personal computer, etc., based on the abnormal output of the closed-loop control algorithm. In such embodiments, the user notification may include a maintenance recommendation. Such maintenance recommendation may include an identity of the mechanical component, and a recommended action such as maintenance, repair, or replacement of the identified mechanical component.

In some embodiments, a method of operating an appliance, such as but not limited to method 900 or method 500, may also include generating a diagnostic report based on the abnormal output of the closed-loop control algorithm.

In some embodiments, the household appliance may include two or more mechanical components of the same type, varying types, or combinations thereof. In such embodiments, one or more of the mechanical components may be operated according to a closed-loop control algorithm or the closed-loop control algorithm, and each mechanical component which is so operated may be monitored and a life or other performance quality of each monitored mechanical component may be predicted or determined based on the outputs of each respective closed-loop control algorithm. That is, multiple mechanical components may be operated according to the same closed-loop control algorithm or different closed-loop control algorithms. In one particular example, where the household appliance is an oven appliance which includes multiple heating elements, each heating element may be operated according to a closed-loop control algorithm, and heating elements of the same or similar size or capacity may be operated according to the same closed-loop control algorithm, whereas one or more other heating elements having different size or capacity may be operated according to a different closed-loop control algorithm. For example, each heating element may be operated according to a PID control algorithm, and different gains may be applied in the PID control algorithm for different heating elements. Thus, exemplary methods according to the present disclosure may include monitoring multiple mechanical components of the household appliance, and may further include identifying which of the multiple monitored mechanical components the abnormal output, e.g., control variable, from the closed-loop control algorithm is associated with. For example, the maintenance recommendation or diagnostic report may include an identity of the one mechanical component out of multiple mechanical components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an appliance, the appliance comprising a user interface, a mechanical component comprising a fan, a sensor positioned and configured to measure a process variable associated with the mechanical component, wherein the process variable associated with the mechanical component comprises a speed of the fan, and a controller in communication with the user interface, the mechanical component, and the sensor, the method comprising:

performing a plurality of operating cycles of the appliance, each operating cycle comprising operating the mechanical component according to a closed-loop control algorithm, wherein operating the mechanical component according to the closed-loop control algorithm comprises:

activating the fan in response to a setpoint value received from the user interface, receiving a plurality of fan speed measurements from the sensor after activating the fan, generating an output from the closed-loop control algorithm based on the setpoint value and each of the plurality of fan speed measurements, wherein each output from the closed-loop control algorithm comprises a control variable, the control variable comprising a power level for the fan, and adjusting an electrical power level supplied to the fan in response to each output from the closed-loop control algorithm;

monitoring each output of the closed-loop control algorithm throughout the plurality of operating cycles of the appliance; and detecting, during a subsequent operating cycle of the appliance, an abnormal output of the closed-loop control algorithm.

2. The method of operating an appliance of claim 1, further comprising predicting a future value of the output of the closed-loop control algorithm for an additional operating cycle of the appliance.

3. The method of operating an appliance of claim 2, further comprising comparing the predicted future value of the output of the closed-loop control algorithm to a critical threshold.

4. The method of operating an appliance of claim 1, further comprising providing a user notification based on the abnormal output of the closed-loop control algorithm, the user notification comprising a maintenance recommendation.

5. The method of operating an appliance of claim 1, further comprising generating a diagnostic report based on the abnormal output of the closed-loop control algorithm.

6. The method of operating an appliance of claim 1, wherein monitoring the output of the closed-loop control algorithm throughout the plurality of operating cycles of the appliance comprises determining a band of typical values for the output of the closed-loop control algorithm, and wherein the abnormal output of the closed-loop control algorithm is outside of the band of typical values.

7. The method of operating an appliance of claim 1, wherein the setpoint received during each operating cycle of the plurality of operating cycles is approximately the same as the setpoint received during every other operating cycle of the plurality of operating cycles.

8. A method of operating an appliance, the appliance comprising a user interface, a mechanical component comprising a heating element, a sensor positioned and configured to measure a process variable associated with the mechanical component, wherein the process variable associated with the mechanical component comprises a temperature associated with the heating element, and a controller in communication with the user interface, the mechanical component, and the sensor, the method comprising:

performing an operating cycle of the appliance, the operating cycle comprising operating the mechanical component according to a closed-loop control algorithm wherein operating the mechanical component according to the closed-loop control algorithm comprises:

activating the heating element in response to a setpoint value received from the user interface, receiving a plurality of temperature measurements from the sensor after activating the heating element, generating an output from the closed-loop control algorithm based on the setpoint value and each of the plurality of temperature measurements, wherein each output from the closed-loop control algorithm comprises a control variable, the control variable comprising a valve position for a fuel supply valve coupled to the heating element, and adjusting a position of the fuel supply valve in response to each output from the closed-loop control algorithm;

monitoring each output of the closed-loop control algorithm during the operating cycle of the appliance;

comparing the monitored output of the closed-loop control algorithm during the operating cycle of the appliance to an output of the closed-loop control algorithm during a previous operating cycle of the appliance; and determining, based on the comparison of the monitored output of the closed-loop control algorithm during the operating cycle of the appliance to the output of the closed-loop control algorithm during the previous operating cycle of the appliance, that the monitored output of the closed-loop control algorithm during the operating cycle of the appliance is an abnormal output.

9. The method of operating an appliance of claim 8, wherein the setpoint value received in the operating cycle of the appliance is approximately equal to a setpoint value received in the previous operating cycle of the appliance.

10. The method of operating an appliance of claim 8, further comprising predicting a life of the mechanical component based on the abnormal output of the closed-loop control algorithm.

11. The method of operating an appliance of claim 10, wherein predicting the life of the mechanical component based on the abnormal output of the closed-loop control algorithm comprises predicting a future value of the output of the closed-loop control algorithm based on the comparison of the monitored output of the closed-loop control algorithm during the operating cycle of the appliance to the output of the closed-loop control algorithm during the previous operating cycle of the appliance and comparing the predicted future value of the output of the closed-loop control algorithm to a critical threshold.

12. The method of operating an appliance of claim 8, further comprising providing a user notification based on the abnormal output of the closed-loop control algorithm, the user notification comprising a maintenance recommendation.

13. The method of operating an appliance of claim 8, further comprising generating a diagnostic report based on the abnormal output of the closed-loop control algorithm.

14. A method of operating an appliance, the appliance comprising a user interface, a mechanical component comprising a fan, a sensor positioned and configured to measure a process variable associated with the mechanical component, wherein the process variable associated with the mechanical component comprises a speed of the fan, and a controller in communication with the user interface, the mechanical component, and the sensor, the method comprising:

performing an operating cycle of the appliance, the operating cycle comprising operating the mechanical component according to a closed-loop control algorithm, wherein operating the mechanical component according to the closed-loop control algorithm comprises:

activating the fan in response to a setpoint value received from the user interface, receiving a plurality of fan speed measurements from the sensor after activating the fan, generating an output from the closed-loop control algorithm based on the setpoint value and each of the plurality of fan speed measurements, wherein each output from the closed-loop control algorithm comprises a control variable, the control variable comprising a power level for the fan, and adjusting an electrical power level supplied to the fan in response to each output from the closed-loop control algorithm;

monitoring each output of the closed-loop control algorithm during the operating cycle of the appliance;

comparing the monitored output of the closed-loop control algorithm during the operating cycle of the appliance to an output of the closed-loop control algorithm during a previous operating cycle of the appliance; and determining, based on the comparison of the monitored output of the closed-loop control algorithm during the operating cycle of the appliance to the output of the closed-loop control algorithm during the previous operating cycle of the appliance, that the monitored output of the closed-loop control algorithm during the operating cycle of the appliance is an abnormal output.

15. The method of operating an appliance of claim 14, wherein the setpoint value received in the operating cycle of the appliance is approximately equal to a setpoint value received in the previous operating cycle of the appliance.

16. The method of operating an appliance of claim 14, further comprising predicting a life of the mechanical component based on the abnormal output of the closed-loop control algorithm.

17. The method of operating an appliance of claim 16, wherein predicting the life of the mechanical component based on the abnormal output of the closed-loop control algorithm comprises predicting a future value of the output of the closed-loop control algorithm based on the comparison of the monitored output of the closed-loop control algorithm during the operating cycle of the appliance to the output of the closed-loop control algorithm during the previous operating cycle of the appliance and comparing the predicted future value of the output of the closed-loop control algorithm to a critical threshold.

* * * * *